(12) United States Patent
Sako

(10) Patent No.: US 6,697,306 B2
(45) Date of Patent: Feb. 24, 2004

(54) DATA RECORDING METHOD, DATA OUTPUTTING METHOD, AND DATA RECORDING AND/OR REPRODUCING METHOD

(75) Inventor: Yoichiro Sako, Tokyo (JP)

(73) Assignee: Sony Corporation, Toyko (JP)

(*) Notice: Subject to any disclaimer, the term of this patent is extended or adjusted under 35 U.S.C. 154(b) by 0 days.

(21) Appl. No.: 10/089,538

(22) PCT Filed: Jul. 31, 2001

(86) PCT No.: PCT/JP01/06605
§ 371 (c)(1),
(2), (4) Date: Mar. 28, 2002

(87) PCT Pub. No.: WO02/11140
PCT Pub. Date: Feb. 7, 2002

(65) Prior Publication Data
US 2002/0149976 A1 Oct. 17, 2002

(30) Foreign Application Priority Data
Jul. 31, 2000 (JP) ......................................... 2000-232464

(51) Int. Cl.[7] ................................................. G11B 7/00
(52) U.S. Cl. ..................... 369/47.12; 369/84; 369/53.21
(58) Field of Search ................................ 369/47.12, 84, 369/47.1, 47.13, 53.22, 53.21

(56) References Cited

U.S. PATENT DOCUMENTS 6,434,322 B1 * 8/2002 Kimura et al. ................. 386/94
6,571,220 B1 * 5/2003 Ogino et al. ................. 380/201

FOREIGN PATENT DOCUMENTS

EP 1001624 * 5/2000 ................. 369/32
JP 2000-312339 * 11/2000 ................. 369/32

* cited by examiner

Primary Examiner—Nabil Hindi
(74) Attorney, Agent, or Firm—Jay H. Maioli

(57) ABSTRACT

Output data are embedded with management information including at least one of copy management information and reproduction management information. A modification is applied to part of the management information embedded in the data to create new management information. The new management information is read from the data, and the read new management information is statistically processed to identify this information. Based on an identification result, data recording or reproduction is controlled. For example, a series of watermarks are embedded in content data. With respect to only part of these watermarks, the copy management information is rewritten from one-generation copy permission to copy inhibition. New watermarks are created, are embedded in the content, and are recorded on a medium.

26 Claims, 6 Drawing Sheets

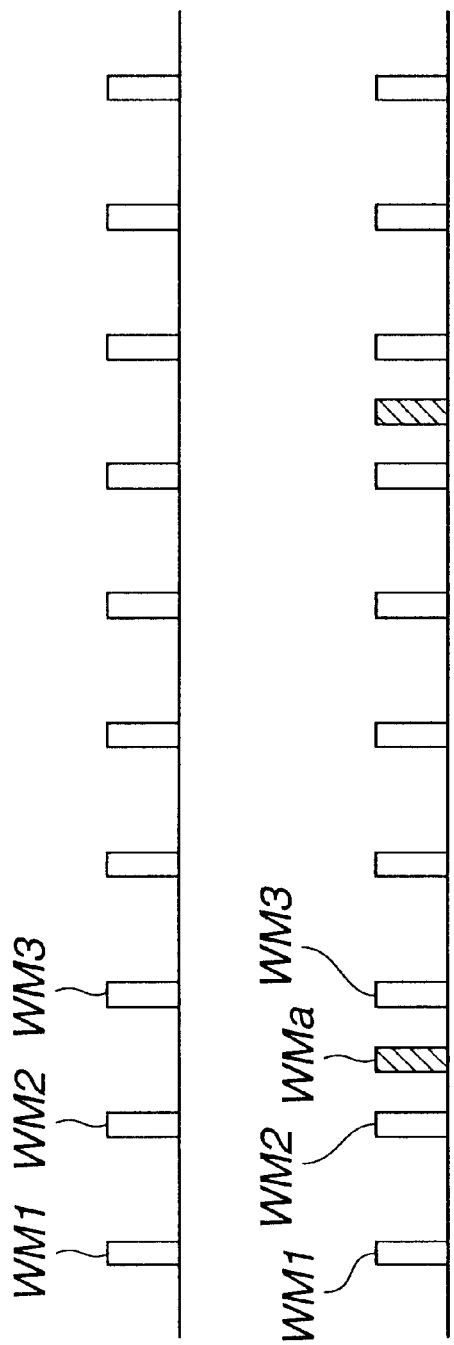

DATA RECORDING METHOD, DATA OUTPUTTING METHOD, AND DATA RECORDING AND/OR REPRODUCING METHOD

TECHNICAL FIELD

The present invention relates to the data recording method, the data output method, and the data recording and/or reproduction method. More specifically, the present invention concerns the data recording method, the data output method, and the data recording and/or reproduction method of recording, reproducing, outputting, and duplicating content data in which copy management information or reproduction management information is embedded as a watermark.

BACKGROUND ART

In recent years, there is an increasing demand for copy protection and copyright protection of digital works and digital contents with the spread of recording media such as DVD (Digital Versatile Disc), the Internet, digital satellite broadcasting, etc. Digital contents such as video and voice are converted to analog signals so as to be audiovisually presented. There is examined a technology which can maintain relatively excellent sound or image quality and prevent an unauthorized copy in analog or compressed copies.

For example, SDMI (Secure Digital Music Initiative) etc. are promoting the actual use of an electronic watermark which persists after an analog or compressed copy of the content.

In this case, the proposed watermark is embedded in an analog or digital signal so that the watermark does not have an unfavorable effect on video and voice signals and is not easily tampered.

The watermark can comprise copy management information and/or reproduction management information. For example, the watermark contains information for the copy generation management such as allowing a copy for only one generation, inhibiting a copy for the second generation or later, etc. It is intended to restrict not only recording (copying), but also reproduction at the time of reproduction for full protection against an unauthorized copy or a so-called pirated copy.

For example, there are specified one-generation copy permission and copy inhibition for copy generation management. In the case of recording (copying) content data embedded with a watermark indicating one-generation copy permission, it is proposed to apply processing such as rewriting the watermark to that indicative of the copy inhibition.

A watermark embedded in analog or digital signals must be protected against modification etc. by suppressing effects on content signals, especially by preventing degradation of these signals. Generally, detecting or attaching this watermark complicates signal processing and causes a heavy load.

When a content provider produces a master disc etc., it is possible to carefully embed a watermark by using high-performance hardware or taking sufficient time as needed so as to maintain the quality of music, video, etc. When a user copies data by using a commercially available recording apparatus, it is impossible to expect the throughput equivalent to that of the provider. Since a realtime or higher copy operation is required, it is difficult to embed the watermark at the same level as the provider.

DISCLOSURE OF THE INVENTION

The present invention has been made in consideration of the foregoing. It is therefore an object of the present invention to provide a data recording method, a data output method, a data recording and/or reproduction method, a data duplication control method, and a recording medium processing apparatus for decreasing loads of rewriting a watermark embedded in contents.

In order to solve the above-mentioned problems, the present invention provides a method of recording data embedded with management information including at least copy management information, wherein part of the management information embedded in the data is modified, is embedded in the data as new management information, and then is recorded.

Further, in order to solve the above-mentioned problems, the present invention provides a method of outputting data embedded with management information including at least one of copy management information and reproduction management information, wherein the method modifies part of the management information embedded in the data, embeds the modified management information as new management information in the data, and then outputs data.

Moreover, the present invention provides a method of outputting data embedded with data management information including at least one of copy management information and reproduction management information, wherein the method modifies part of the management information embedded in the data to create new management information and reads the new management information embedded in the data from the data, the method further comprising: statistically processing the read new management information and identifying the read new management information; and controlling recording or reproduction of data controlling recording or reproduction of the data based on the identification result.

Furthermore, the present invention provides a method of duplicating data embedded with data management information including at least copy management information, wherein the method modifies part of the management information embedded in the data to create new management information and reads the new management information embedded in the data from the data, the method further comprising: statistically processing the read new management information and identifying the read new management information; and controlling output for the data duplication based on the identification result.

Still further, the present invention comprises a head section which uses a recording medium recording data embedded with management information including at least one of copy management information and reproduction management information and reads the data from the recording medium; an extraction section which extracts the management information from the data read from the recording medium by the head section; an identification section which identifies the read management information extracted by the extraction section; a control section which controls duplication or reproduction of the data based on an identification result by the identification section; and a processing section which is controlled by the control section and, when the data is output for duplication, modifies part of the management information embedded in the data to embed the modified management information as new management information in the data.

BRIEF DESCRIPTION OF THE DRAWINGS

FIGS. 4A and 4B illustrate an example of adding a new watermark having copy management information for copy inhibition;

BEST MODE FOR CARRYING OUT THE INVENTION

Embodiments of the present invention will be described with reference to the accompanying drawings.

Figure 1:
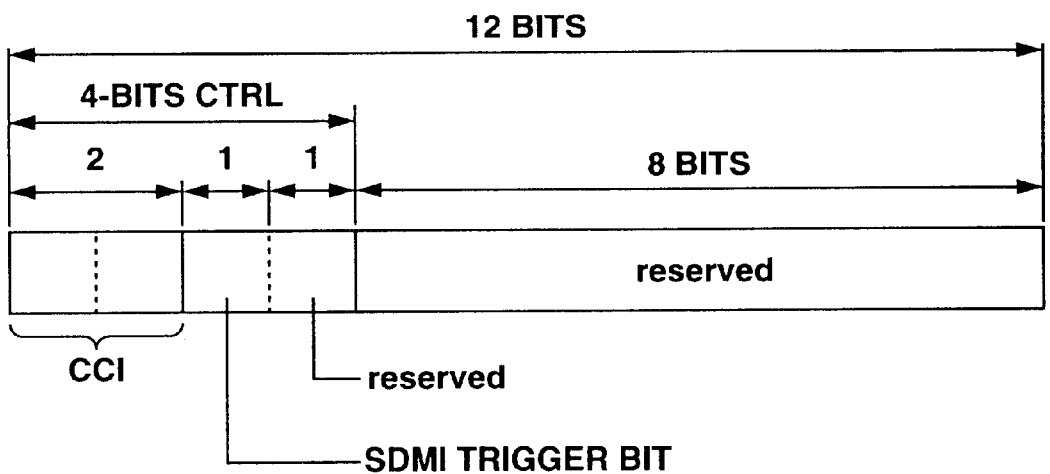
FIG. 1 shows a data structure of copy management information standardized by SDMI (Secure Digital Music Initiative)

FIG. 1 shows a data structure of a watermark which contains copy management information standardized by SDMI (Secure Digital Music Initiative). The example in FIG. 1 shows the data structure of copy management information for SDMI Phase 1.

As shown in FIG. 1, the entire copy management information comprises 12 bits. The first four bits form a CTRL (control) area. The remaining eight bits are used as a reserved area. In the 4-bit CTRL area, the first two bits represent CCI (Copy Control Information) which is generally referred to as SCMS (Serial Copy Management System). The CCI bits set to "0, 0" indicate copy free; "1, 0" one-generation copy permission; "1, 1" copy inhibition; and "0, 1" reserved. The next one bit (third bit in CTRL) is used as an SDMI trigger bit. This bit reset to "0" indicates no trigger. This bit set to "1" indicates availability of a trigger. The SDMI trigger bit set to "1" signifies upgrade to SDMI Phase 2. The next one bit (fourth bit in CTRL) is reserved.

It is assumed that content data is embedded with the above-mentioned copy management information as a watermark. When this data is copied with CCI set to "1, 0" (one-generation copy permission), the copy management information is rewritten to CCI "1, 1" (copy inhibition). The watermark with this information is embedded and recorded in the content.

There are proposed some methods of inserting a watermark. For example, a watermark is arranged near the power peak of an original signal for the content or in an area whose frequency hardly affects the audiovisual presentation. Alternatively, the spread spectrum system is used. It may be preferable to use either of these methods or other methods.

Figure 2:
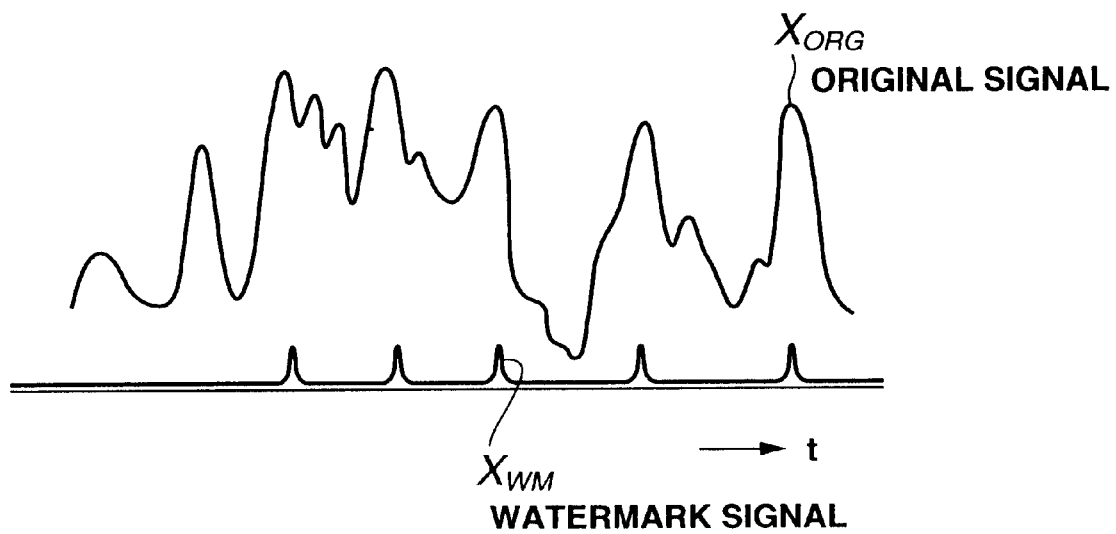
FIG. 2 shows an example of inserting a watermark.

FIG. 2 schematically shows an example of inserting a watermark signal $X_{WM}$ near the power peak of an original signal $X_{ORG}$ for the content. Obviously, the method of inserting a watermark is not limited to the example in FIG. 2.

While SDMI (Secure Digital Music Initiative) specifies detection of watermarks once in 15 seconds, the detection thereof generally causes a load. A watermark may be embedded in the content by rewriting the copy management information of the watermark. In such as case, a recording and/or reproducing apparatus is required of further increased signal processing loads in order to suppress an effect on visual and auditory senses and increase reliability or robustness.

To solve this problem, the embodiment of the present invention can accomplish rewriting of the copy management information for watermarks just by rewriting part of all embedded watermarks. More specifically, conditions are eased, e.g., by rewriting one out of five watermarks embedded in content data or rewriting watermarks every 30 seconds while detecting watermarks every 15 seconds. In other words, watermarks are rewritten less frequently than they are embedded or detected.

When there is a case of reproducing content data whose watermarks are partially rewritten or updated, the copy management information for a plurality of watermarks is statistically processed and is decided or identified for recording or reproduction control. For example, when watermarks are detected, a plurality of copy management information entries is collected from the detected watermarks. Then, a decision is made to prioritize updated copy management information entries out of the collected ones. Namely, it is assumed that watermarks are embedded in content data created by copying content data capable of one-generation copy. Some of the watermarks may remain unrewritten or are unsuccessfully rewritten. The unrewritten copy management information contains CCI set to "1, 0" unchanged. The rewritten copy management information contains CCI set to "1, 1" (copy inhibition). When the original content contains a watermark whose CCI is set to "0, 0" or "1, 1", the watermark is not rewritten. When there are mixed CCIs "1, 0" and "1, 1", the updated CCI "1, 1" takes precedence. However, the watermark may be incorrectly detected or read. It is desirable to impose a condition for copy inhibition such as detecting the specified number of CCI codes (e.g., two CCI codes) or more set to "1, 1".

If there is a case of reproducing content data whose watermarks are partially updated, it is possible to prioritize a watermark with a more restricted copy condition. In this case, the most prioritized CCI is "1, 1" indicating the copy inhibition. When there are mixed CCI codes "1, 0" (one-generation copy permission) and "0, 0" (copy free), CCI set to "1, 0" takes precedence as a stricter copy condition for the copy management information. Also in this case, it is useful to impose a condition of detecting, e.g., two CCI codes or more considering incorrect detection etc.

When a plurality of types of copy management information is detected, it is possible to determine the copy management information by majority decision. For example, when there are mixed CCI codes "1, 0" and "0, 0", the copy management information having more CCI codes is used for control.

The above-mentioned copy management information etc. are just examples. The present invention is not limited thereto. For full protection against an unauthorized copy or a so-called pirated copy, it is intended to restrict not only recording (copying), but also reproduction at the time of reproduction. It is also possible to use the copy management information and/or the reproduction management information.

Figures 3A, 3B:
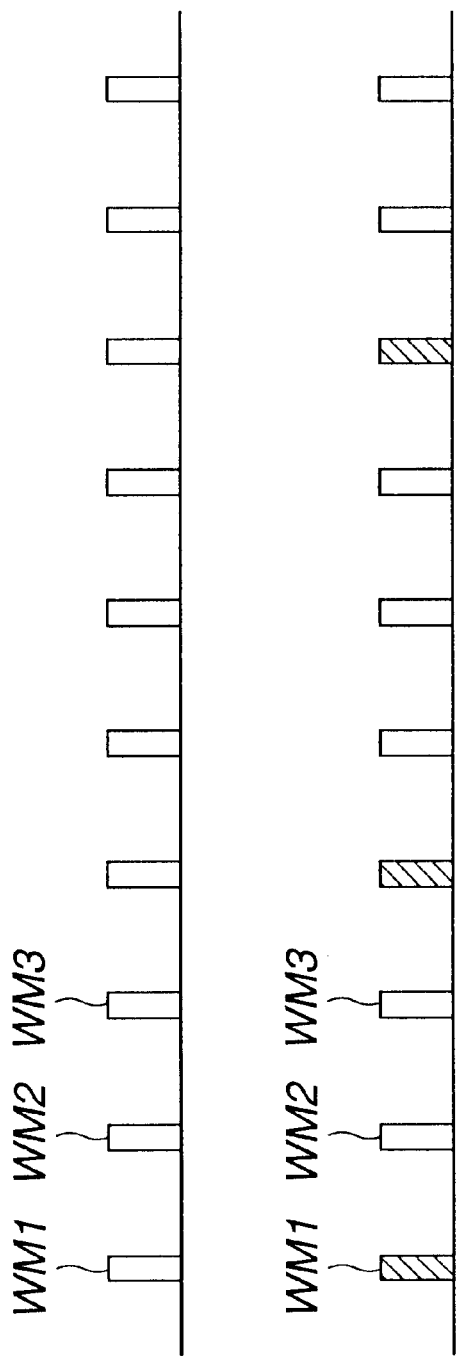
FIGS. 3A and 3B illustrate an example of rewriting part of watermarks embedded in contents.

FIGS. 3A and 3B illustrate an example of rewriting part of watermarks already embedded in content data. FIG. 3A shows watermarks WM1, WM2, WM3, and so on which are detected during content data reproduction. Some of these detected watermarks WM1, WM2, WM3, and so on are rewritten and are shaded in FIG. 3B. When the detected watermarks WM1, WM2, WM3, and so on have the copy management information with CCI "1, 0" (one-generation copy permission), some of the detected watermarks WM1, WM2, WM3, and so on are rewritten to CCI "1, 1" (copy inhibition) during a content data copy. The rewritten watermarks are re-embedded as new WM1', WM2', WM3', and so on back to the content data and are recorded on a medium. FIG. 3A may represent watermarks themselves embedded in the content data.

Watermarks are rewritten periodically or unperiodically. As an example of periodical rewriting, watermarks are rewritten at a specified time interval or in units of a specified number of watermarks. As an example of unperiodical rewriting, watermarks are rewritten in units of a properly varying number of watermarks.

The example in FIGS. 3A and 3B above shows a method of rewriting the copy management information for the already embedded watermarks from one-generation copy permission to copy inhibition. As another example, it is possible to provide a method of adding a new watermark with the copy management information indicating copy inhibition by keeping; the already embedded watermarks unchanged.

FIGS. 4A and 4B illustrate an example of adding a new watermark having the copy management information indicating the copy inhibition. FIG. 4A shows watermarks WM1, WM2, WM3, and so on which are detected during content data reproduction. While the detected watermarks WM1, WM2, WM3, and so on are unchanged, a shaded watermark WMa is newly added as shown in FIG. 4B. This new watermark specifies the copy inhibition.

Like the watermark rewriting as shown in FIGS. 3A and 3B, it is also possible to periodically or unperiodically add watermarks. The reproduction management information may be used instead of the copy management information.

The following exemplifies a recording and/or reproducing apparatus to which the present invention is applied.

Figure 5:
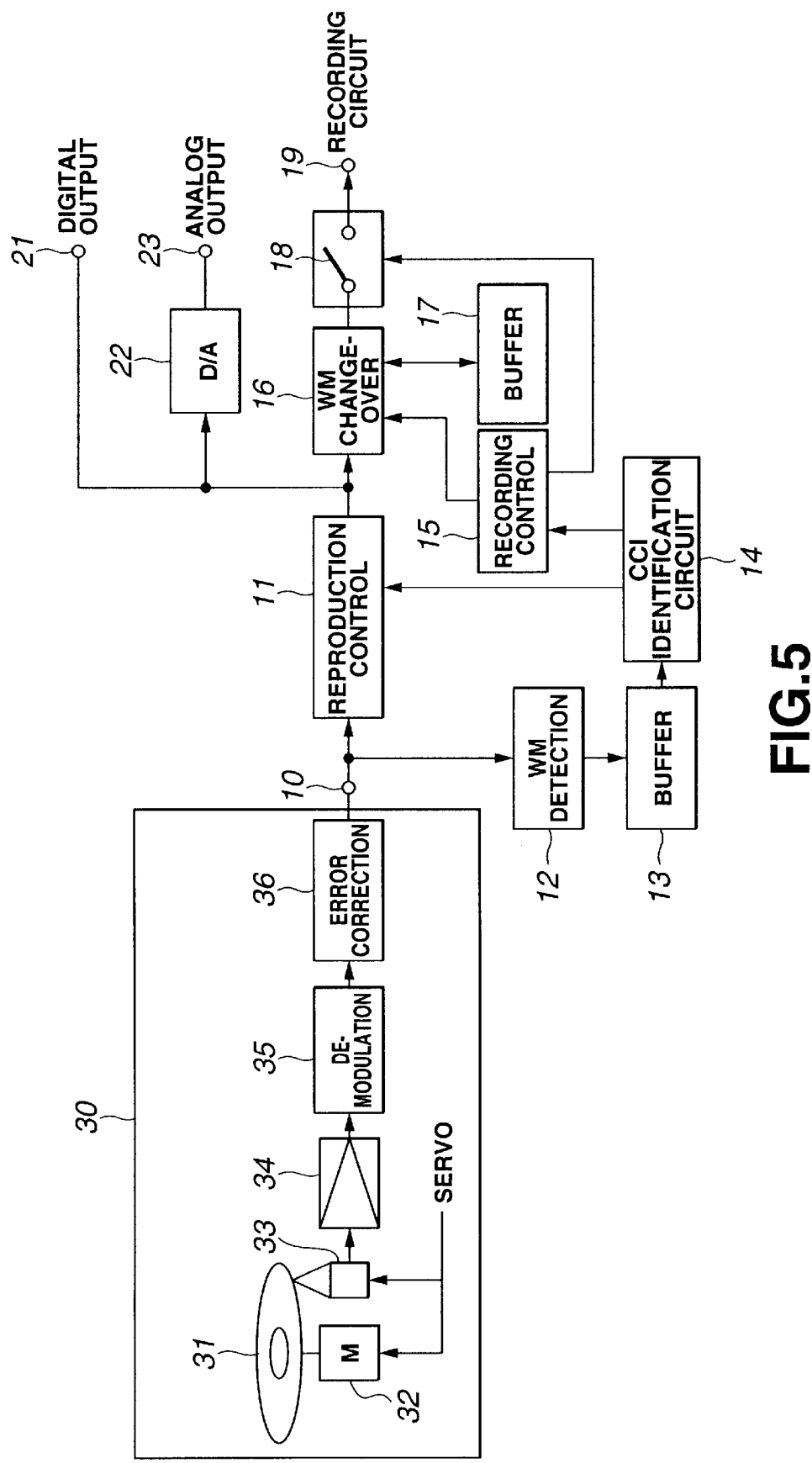
FIG. 5 is a block diagram showing part of an optical disc reproducing apparatus and recording apparatus to which the present invention is applied.

FIG. 5 is a block diagram showing part of an optical disc reproducing apparatus and recording apparatus. In an optical disc reproducing section 30 of FIG. 5, an optical disc 31 records content data embedded with watermarks. The optical disc 31 is rotatively driven by a spindle motor 32, e.g., at a constant linear speed. An optical pickup head 33 irradiates a laser beam to the optical disc 31, reads a content data signal recorded on the optical disc 31, and sends this signal to a reproducing amplifier 34. A controller (not shown) is provided in the reproducing section 30 and servocontrols the spindle motor 32 and the optical pickup head 33. The servocontrol includes a disc rotation servo, a tracking servo, focus servo, etc. by using various servo signals. An output signal from the reproducing amplifier 34 is supplied with an output signal from the optical pickup head 33. The output signal is then supplied to a demodulation circuit 35 and is demodulated here. The demodulated signal is supplied to an error correction circuit 36 and is error-corrected here. Output data from the error correction circuit 36 is supplied as reproduction data, i.e., content data to a terminal 10.

The reproducing apparatus is not limited to an optical disc reproducing apparatus. For example, it is possible to use reproducing apparatuses for various media such as a magnetic disc, magnetic tape, semiconductor memory, etc. The content data signal applied to the terminal 10 is not limited to a signal reproduced from the media reproducing apparatus. It is possible to use a signal input via an interface (I/F) or a signal received at a tuner etc. Namely, the present invention can be applied to content data supplied from whatever signal supply means only if the content data is embedded with the copy management information or the reproduction management information in the form of a watermark.

The content data supplied to the terminal 10 in FIG. 5 is sent to a reproduction control circuit 11 and a WM (watermark) detection circuit 12. A buffer 13 buffers at least management information about copy or reproduction, e.g., CCI, in the watermark information detected by the WM detection circuit 12. The CCI is then sent to a CCI identification circuit 14. As will be described later, the CCI identification circuit 14 makes a decision according to the number of CCI codes such as "1, 0", "1, 1", etc. The CCI identification circuit 14 sends a decision result to the reproduction control circuit 11 and a recording control circuit 15. The CCI described with reference to FIG. 1 is used for copy generation management, not for reproduction management. Accordingly, the reproduction control circuit 11 in FIG. 5 is unnecessary. However, there may be a management information standard for restricting not only recording (copy), but also reproduction at the time of reproduction. The reproduction control circuit 11 is provided in consideration of the use of this reproduction management information. Apparently, either the reproduction control circuit 11 or the recording control circuit 15 in FIG. 5 is omissible according to the management information to be used.

The content data from the reproduction control circuit 11 is sent to a WM (watermark) changeover circuit 16. When the watermark CCI is "1, 0" (one-generation copy permission), copying this content data embeds the watermark with CCI changed to "1, 1" (copy inhibition). As described above with reference to FIGS. 3A, 3B, 4A, and 4B, there is a case of rewriting part of the copy management information in the already embedded watermarks. There is another case of adding a watermark having the copy management information of copy inhibition by keeping the already embedded watermarks unchanged. The WM changeover is controlled by a control signal from the recording control circuit 15. A buffer 17 is connected to the WM changeover circuit 16. An output signal from the WM changeover circuit 16 is sent to a recording circuit (not shown) via a switch 18 and a terminal 19 and is recorded on a recording medium such as a recordable optical disc in the recording circuit. The switch 18 is controlled by a control signal from the recording control circuit 15. When the CCI is set to "1, 1", the switch 18 turns off to inhibit recording (copy) of content data.

An output signal from the reproduction control circuit 11 is generated as digital output data or a digital output signal via a terminal 21. Further, an output signal from the reproduction control circuit 11 is converted to an analog signal in a D/A converter 22 and is generated as an analog output signal from a terminal 23. When the reproduction control circuit 11 is not used, the content data as output data from the terminal 10 is sent to the WM changeover circuit 16, the terminal 21, or the D/A converter 22.

As mentioned above, the CCI identification circuit 14 statistically processes the watermark CCI and determines the management information for copying or reproducing content data based on the statistically processed CCI. This process is used for determining which CCI to use when two or more types of CCI are detected, considering the case that copying the content data rewrites only some of the watermarks. The following describes an example of operations in the CCI identification circuit 14 with reference to FIG. 6.

Figure 6:
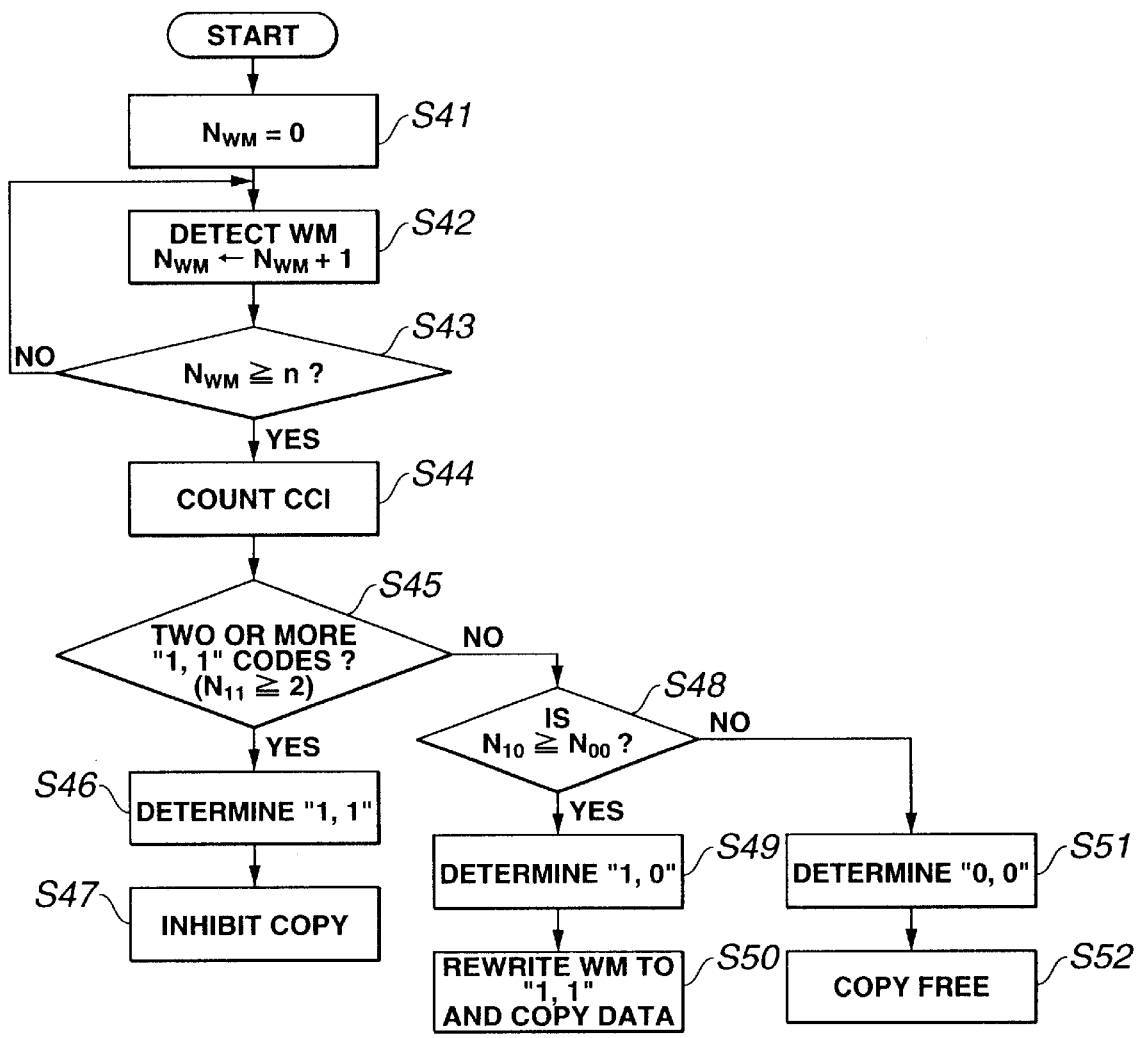
FIG. 6 is a flowchart exemplifying operations in a CCI (Copy Control Information) identification circuit 14.

At the first step S41 in FIG. 6, the process initializes count value $N_{WM}$ for detecting the number of watermarks. Namely, count value $N_{WM}$ is zero-cleared ($N_{WM}=0$). At step S42, count value $N_{WM}$ is incremented ($N_{WM} \leftarrow N_{WM}+1$) each time a WM (watermark) is detected. According to SDMI, for example, a watermark is detected once every 15 seconds.

Count value $N_{WM}$ is incremented when a watermark is detected every 15 seconds. A watermark detection interval is not limited thereto.

At step S43, it is determined whether the watermark detection reaches a specified number of times n ($N_{WM} \geq n$). When the result is NO, the process returns to step S42. When the result is YES, the process proceeds to step S44.

At step S44, the number of watermarks (the number of detections) is counted for CCI codes of "1, 1", "1, 0", and "0, 0". The corresponding count values are assumed to be $N_{11}$, $N_{10}$, and $N_{00}$, respectively.

At step S45, it is determined whether the detection of CCI "1, 1" reaches a specified number of counts, e.g., 2 or more as a threshold value for determination. This step is used for determining copy inhibition when two or more CCI codes "1, 1" are detected because the detection of only one CCI code may be subject to an effect of incorrect detection or a noise. The threshold value is not limited to 2, but may be set to 3, 4, or more. As mentioned above, however, copying the content data rewrites the CCI for only part of watermarks. It is necessary to reliably rewrite as many CCI codes as the threshold value or more within the range of the watermark detection count n. For example, the threshold value is set to 2 when rewriting one out of two watermarks detected during a copy. In this case, the watermark detection count n must be set to 4 or more. It is desirable to use a larger value for the watermark detection count n considering unsuccessful rewriting or detection.

When step S45 results in YES, the process proceeds to step S46 and determines that the watermark contains CCI "1, 1" (copy inhibition). At step S47, the process performs a control operation for content data copy inhibition. This control operation for copy inhibition includes turning off the switch 18 by the recording control circuit 15 etc.

When step S45 results in NO, the process proceeds to step S48 and determines whether count $N_{10}$ for CCI "1, 0" is greater than or equal to count $N_{00}$ for CCI "0, 0" ($N_{10} \geq N_{00}$). This step is used to check if CCI codes "1, 0" and "0, 0" are mixed. There is a case of prioritizing a CCI code with a stricter copy condition, i.e., prioritizing a CCI code for restricting a copy. In this case, it may be preferable to determine whether the "1, 0" count is greater than or equal to a specified threshold value, e.g., 2 ($N_{10} \geq 2$). Also in this case, the threshold value is not limited to 2.

When step S48 results in YES, the process proceeds to step S49 and determines "1, 0" (one-generation copy permission). At step S50, the process rewrites the watermark's CCI to "1, 1" (copy inhibition) and copies the content data. Step S50 is used for copying content data and does not rewrite the watermark's CCI in the case of reproduction only.

When step S48 results in NO, the process proceeds to step S51 to determine "0, 0" (copy free) and provides copy free control at step S52.

FIG. 6 shows general operations in the CCI identification circuit 14 including reproduction and recording (copy) of content data. Further, there are operations of rewriting watermarks when copying content data embedded with watermarks having CCI indicative of one-generation copy permission ("1, 0"). Especially, there are operations of rewriting CCI "1, 0" to "1, 1" in only part of detected watermarks. These operations are explained with reference to FIGS. 7 and 8.

Figure 7:
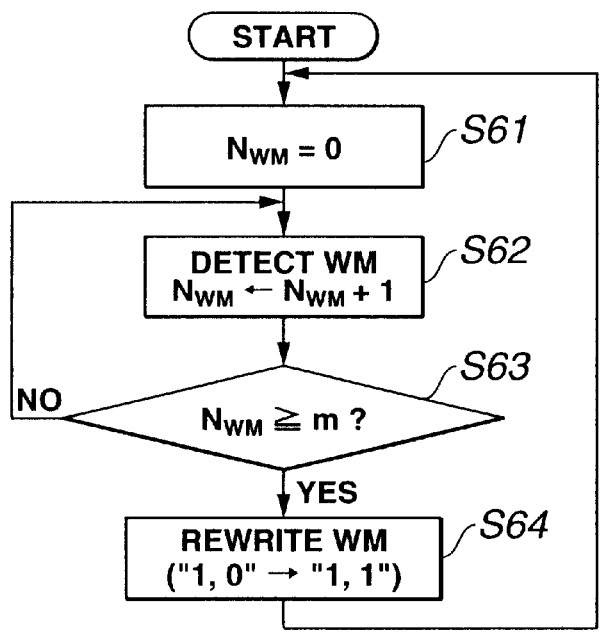
FIG. 7 is a flowchart showing an example of rewriting one CCI code per m detected watermarks.
Figure 8:
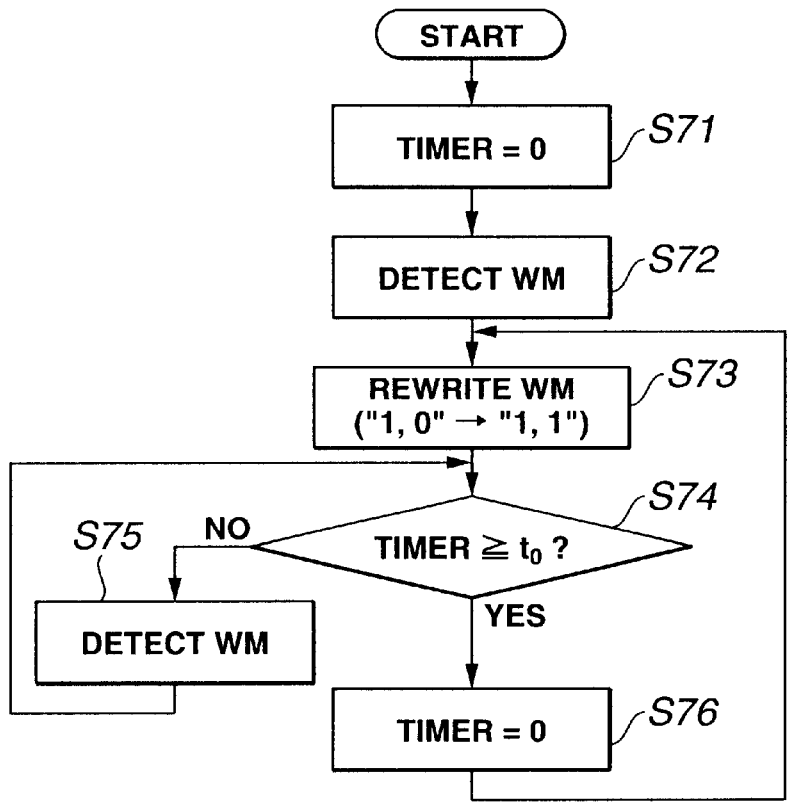
FIG. 8 is a flowchart showing an example of rewriting CCI of one watermark at a specified interval of $t_0$.

FIG. 7 shows an example of rewriting one CCI code per m detected watermarks. FIG. 8 shows an example of rewriting CCI of one watermark at a specified interval of $t_0$.

At the first step S61 in FIG. 7, the process initializes count value $N_{WM}$ for detecting the number of watermarks. Namely, count value $N_{WM}$ is zero-cleared ($N_{WM}=0$). At step S62, a watermark is detected. At step S62, count value $N_{WM}$ is incremented ($N_{WM} \leftarrow N_{WM}+1$).

At step S63, it is determined whether the watermark detection reaches a specified number of times m ($N_{WM} \geq m$). When the result is NO, the process returns to step S62. When the result is YES, the process proceeds to step S64. At step S64, the process rewrites the watermark's CCI "1, 0" to "1, 1", and then returns to step S61.

The process in FIG. 7 rewrites CCI at an interval of one out of m detected watermarks. This process rewrites CCI of a watermark embedded in the content data and re-embeds that watermark back to the content data. Instead, it may be obviously preferable to create a new watermark having CCI "1, 1" as shown in FIG. 4B and additionally embed this watermark in the content data.

At the first step S71 in FIG. 8, the process resets a timer (TIMER) to measure specified time $t_0$ (TIMER=0), and then detects a WM (watermark) at step S72. At step S73, the process rewrites the watermark's CCI "1, 0" to "1, 1", and then proceeds to step S74.

At step S74, the process determines if the timer reaches the above-mentioned specified time $t_0$ (TIMER $\geq t_0$). When the result is NO, the process proceeds to step S75 to detect a watermark. When the result is YES at step S74, the process proceeds to step S76 and resets the timer. The process then returns to step S73 and rewrites the watermark.

The process in FIG. 8 rewrites CCI for one of watermarks detected within specified time $t_0$. This process rewrites CCI of a watermark embedded in the content data and re-embeds that watermark back to the content data. Instead, as mentioned above, it may be preferable to create a new watermark having CCI "1, 1" as shown in FIG. 4B and add this new watermark to the already embedded watermarks.

According to the embodiment of the present invention as mentioned above, watermarks are rewritten less frequently than they are embedded or detected in the content data. This alleviates loads for rewriting or adding watermarks when content data is copied. When a content provider creates a master, it is possible to embed watermarks by taking a sufficient time and using high performance for creating content data. However, a user's recording or reproducing apparatus is subject to limitations on the time or the processing power. Accordingly, the embodiment of the present invention can alleviate loads and decrease visual or acoustical effects by decreasing the frequency of rewriting watermarks.

Content data may be embedded with partially rewritten watermarks or a newly generated watermark. When such content data is reproduced, there are detected watermarks with a plurality of types of copy management information. The content data can be normally controlled for recording or reproduction by statistically processing the copy management information for a plurality of watermarks detected from the content data. The statistical processing includes prioritizing the copy management information subject to the copy restriction, prioritizing the updated or added copy management information, etc. This can provide sufficient copy control.

Accordingly, suppose the situation to record content data embedded with management information for copy and/or reproduction in the form of a watermark. In this case, the embodiment according to the present invention periodically or unperiodically rewrites only part of the aforementioned embedded management information and records the rewritten information as new embedded management information. Thus, it is possible to alleviate loads for rewriting watermarks when the content data is copied.

Again, suppose the situation to record content data embedded with management information for copy and/or reproduction in the form of a watermark. In this case, the embodiment according to the present invention embeds to record management information which is periodically or unperiodically updated less frequently than the aforementioned embedded management information. Thus, it is possible to alleviate loads for adding watermarks when the content data is copied.

When copying content data, a user's recording and/or reproducing apparatus can rewrite or generate a watermark which is hardly tampered without having adverse effects on video or audio signals.

Further, suppose the situation to reproduce content data embedded with management information for copy and/or reproduction in the form of a watermark. In this case, the embodiment according to the present invention detects the aforementioned management information, statistically processes the detected management information, and determines the content of the management information. Thus, even if a plurality of types of detected management information contains different types, it is possible to determine the proper management information and provide correct control for recording (copy) and reproduction. Specifically, the copyright can be effectively protected by prioritizing the updated or added management information or prioritizing the management information subject to restrictions on copy or reproduction.

The above-mentioned embodiment provides the example of the copy management information as a watermark in FIG. 1. The present invention is not limited thereto and can use other formats of copy management information. The embodiment describes the copy management information as embedded information for watermarks. For full protection against an unauthorized copy or a so-called pirated copy, it is intended to restrict not only recording (copying), but also reproduction at the time of reproduction. In this case, it is also possible to use the reproduction management information.

What is claimed is:

1. A data recording method of recording data embedded with management information including at least copy management information, wherein part of said management, information is modified, embedded in said data as new management information, and is recorded, wherein said method periodically rewrites said management information to generate said new management information.

2. The data recording method according to claim 1, wherein said management information is dispersedly embedded in said data and said dispersedly embedded management information is rewritten at a specified interval.

3. The data recording method according to claim 1, wherein said management information is embedded in said data at a specified cycle and said management information is rewritten at a specified interval.

4. The data recording method according to claim 1, wherein said method counts a number of entries for said management information embedded in said data and rewrites said management information when said count reaches a specified number of entries.

5. The data recording method according to claim 1, wherein said method determines whether a specified time is elapsed and rewrites one of a plurality of management information entries detected within said specified time when said specified time is elapsed.

6. The data recording method according to claim 1, wherein said method inhibits a recording of said data when said copy management information indicates a copy inhibition.

7. A data output method of outputting data embedded with management information including at least one of copy management information and reproduction management information, wherein said method modifies part of said management information embedded in said data, embeds said modified management information as new management information in said data, and outputs said data, and wherein said method periodically rewrites said management information to generate said new management information.

8. The data output method according to claim 7, wherein said management information is dispersedly embedded in said data and said dispersedly embedded management information is rewritten at a specified interval.

9. The data output method according to claim 7, wherein said management information is embedded in said data at a specified cycle and said management information is rewritten at a specified interval.

10. A data recording and reproducing method of outputting data embedded with data management information including at least one of copy management information and reproduction management information, wherein said method modifies part of said management information embedded in said data to create new management information and reads said new management information embedded in said data from said data, said method comprising the steps of:

statistically processing said read new management information and identifying said read new management information; and controlling one of recording and reproduction of said data based on a result of said identification.

11. The data recording and reproducing method according to claim 10, wherein said method identifies said management information based on a number of copy management information entries extracted from said read new management information.

12. The data recording and reproducing method according to claim 11, wherein said method prioritizes said copy management information with a strict copy condition when a plurality of types of said copy management information is extracted from said read new management information.

13. The data recording and reproducing method according to claim 12, wherein said method inhibits said data recording when said extracted new management information indicates a copy inhibition.

14. The data recording and reproducing method according to claim 11, wherein said method prioritizes said reproduction management information with a strict reproduction condition when a plurality of types of said reproduction management information is extracted from said read new management information.

15. A data duplication control method of duplicating data embedded with data management information including at least copy management information, wherein said method modifies part of said management information embedded in said data to create new management information and reads said new management information embedded in said data from said data, said method comprising the steps of:

statistically processing said read new management information and identifying said read new management information; and controlling an output for said data duplication based on a result of said identification.

16. The data duplication control method according to claim 15, wherein said method identifies said management information based on a number of copy management information entries extracted from said read new management information.

17. The data duplication control method according to claim 16, wherein said method prioritizes said copy management information with a strict copy condition when a plurality of types of said copy management information is extracted from said read new management information.

18. The data duplication control method according to claim 15, wherein said method inhibits a recording of said data when said new management information indicates a copy inhibition.

19. A recording medium processing apparatus, comprising:

a head section that uses recording medium recording data embedded with management information including at least one of copy management information and reproduction management information and that reads said data from said recording medium;

an extraction section that extracts said management information from said data read from said recording medium by said head section;

an identification section that identifies said read management information extracted by said extraction section;

a control section that controls one of duplication and reproduction of said data based on an identification result by said identification section; and a processing section that is controlled by said control section and that modifies part of said management information embedded in said data to embed said modified management information as new management information in said data when said data is output for duplication, wherein said processing section periodically rewrites said management information to create said new management information.

20. The recording medium processing apparatus according to claim 19, wherein said management information is dispersedly embedded in said data and said processing section rewrites said dispersedly embedded management information at a specified interval.

21. The recording medium processing apparatus according to claim 19, wherein said management information is embedded in said data at a specified cycle and said processing section rewrites said management information at a specified interval.

22. The recording medium processing apparatus according to claim 19, wherein said processing section counts a number of entries for said management information embedded in said data and rewrites said management information when said count reaches a specified number of entries.

23. The recording medium processing apparatus according to claim 19, wherein said processing section determines whether a specified time is elapsed and rewrites one of a plurality of management information entries detected within said specified time.

24. The recording medium processing apparatus according to claim 19, wherein said processing section updates said management information less frequently than said management information is embedded to create said new management information.

25. The recording medium processing apparatus according to claim 19, wherein said processing section inhibits a recording of said data when said copy management information indicates a copy inhibition.

26. The recording medium processing apparatus according to claim 19, wherein said apparatus further comprises a reproduction processing section supplied with an output signal from said head section, wherein reproduction processing is applied to said supplied output signal; and said reproduction processing section inhibits reproduction of said output signal supplied from said head section when said management information identified by said identification section inhibits said reproduction of said data recorded on said recording medium.

\* \* \* \* \*